Aug. 19, 1969     C. C. CZUSZAK     3,461,893

OVERSPEED RESPONSIVE STEAM TURBINE CONTROL VALVE

Filed March 27, 1967     2 Sheets-Sheet 1

INVENTOR.
CHARLES C. CZUSZAK.
BY *James E. Schardt*
ATTORNEY.

INVENTOR.
CHARLES C. CZUSZAK.
BY James E Schardt
ATTORNEY.

United States Patent Office
3,461,893
Patented Aug. 19, 1969

3,461,893
OVERSPEED RESPONSIVE STEAM TURBINE CONTROL VALVE
Charles C. Czuszak, Greensburg, Pa., assignor to Carrier Corporation, Syracuse, N.Y., a corporation of Delaware
Filed Mar. 27, 1967, Ser. No. 626,180
Int. Cl. F01d *21/02, 21/16*
U.S. Cl. 137—31                                    2 Claims

ABSTRACT OF THE DISCLOSURE

A steam turbine and an overspeed control therefor including a combination throttle and trip valve. The valve has a threaded stem rotatable in a split nut to adjust the valve opening. The valve can be closed rapidly by spreading the halves of the split nut, thereby allowing the valve stem to drop to closed position.

Background of the invention

This invention relates to steam turbines, and more particularly to a steam turbine control system employing a throttle valve having provisions thereon for rapid closing thereof. In many valve installations, such as a steam throttle valve for steam turbines, it is desirable to utilize a valve that is capable of almost instantaneous closing under certain circumstances such as turbine overspeed to prevent damage to the turbine or the equipment being drive thereby.

It has been the practice to utilize valves having threaded stems in engagement with a slidable, threaded collar. The collar is locked in place for ordinary valve stem adjustments by a pivoted lever having means associated therewith for releasing the lever to allow the collar and valve stem to drop and close the valve in response to a condition necessitating rapid closure of the valve.

Summary of the invention

In accordance with a preferred embodiment of this invention, an improved control system including a combination throttle and trip valve is provided for a steam turbine, said valve utilizing a threaded split nut for engagement with the valve stem to provde adjustment thereof. A rotatable cam block having cam tracks therein for engagement with cam pins on the split nut is provided for disengaging each half of the split nut from the valve stem. The valve stem is biased towards closed position. Therefore, when the cam block is rotated to disengage the split nut from the valve stem, the valve immediately closes.

Description of the preferred embodiment

Figure 1:
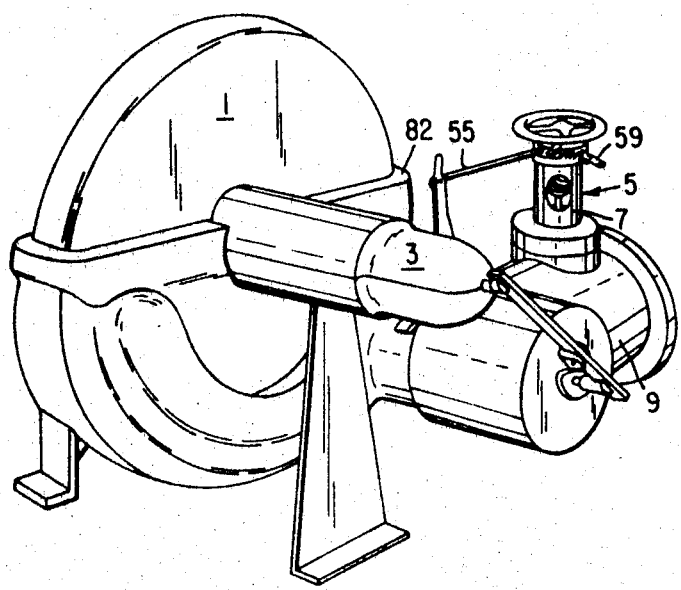
FIGURE 1 is a perspective view of the steam turbine employing a combination throttle and trip valve.

Referring more particularly to the drawings, there is shown a steam turbine 1 having a governor assembly 3 and a combination trip and throttle valve 5. The combination trip and throttle valve 5 comprises a housing 7 having a base section 9 with inlet 11 and outlet 13 formed therein divided by a double partition 15 having fluid passageways 17 therethrough. A bonnet section 19 formed in upper section 21 of housing 7 is provided with a labyrinth 23 to prevent fluid leakage from base section 9 of the valve. A valve stem 25 having a double disk affixed to one end thereof by pin 31 is biased towards closed position by spring 33. The spring 33 is compressed between upper section 21 and spring retaining cup 35 which is suitably positioned on valve stem 25 as by a shoulder 37. The valve stem 25 is held in the desired adjusted position by a split nut 39 which is adapted for sliding movement in track 41 formed in upper section 21 of the housing 7. A cap 43 affixed to upper section 21, as by bolts 45, is provided with a cam block 47 which is held therein by retaining ring 49. Each half of split nut 39 is provided with a pin 51 for engagement in cam tracks 53 formed in cam block 47. A trip rod 55 is provided for mating engagement with detent 57 in cam block 47 to prevent rotation thereof.

Figure 4:
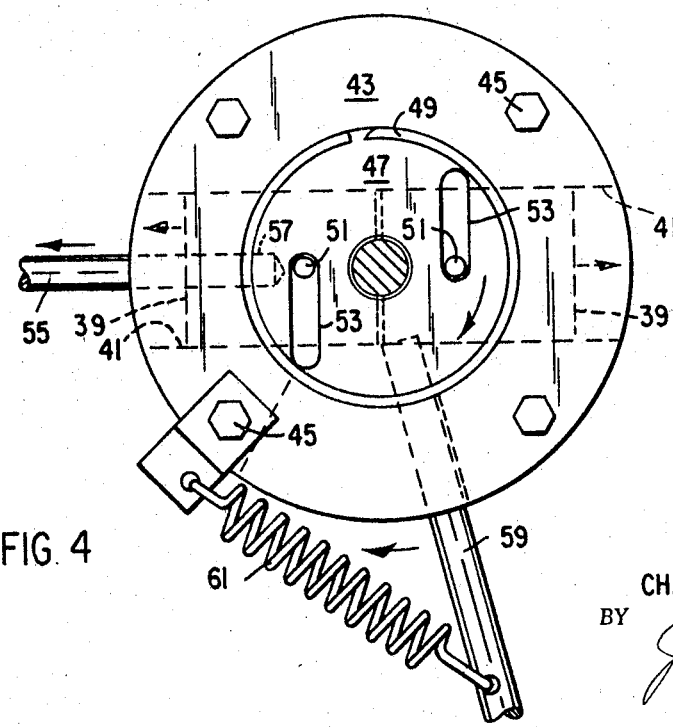
FIGURE 4 is a top view of the valve illustrated in FIGURES 2 and 3.

A lever 59 affixed to cam block 47 is biased by spring 61 to rotate cam block 47 when trip rod 55 is disengaged from detent 57. As can be seen from FIGURE 4, the cam tracks are shaped so that upon rotation of the cam block, the side wall of the tracks bears against the pins forcing them and the parts with which they are associated outwardly relative to the stem. This action releases the threaded engagement between the nut and stem, causing the stem to move abruptly downward under the force exerted by spring 33.

A handwheel 63 affixed to stem 25 by nut 65 is provided for adjusting the position of stem 25 when the split nut 39 is engaged therewith.

Figure 2:
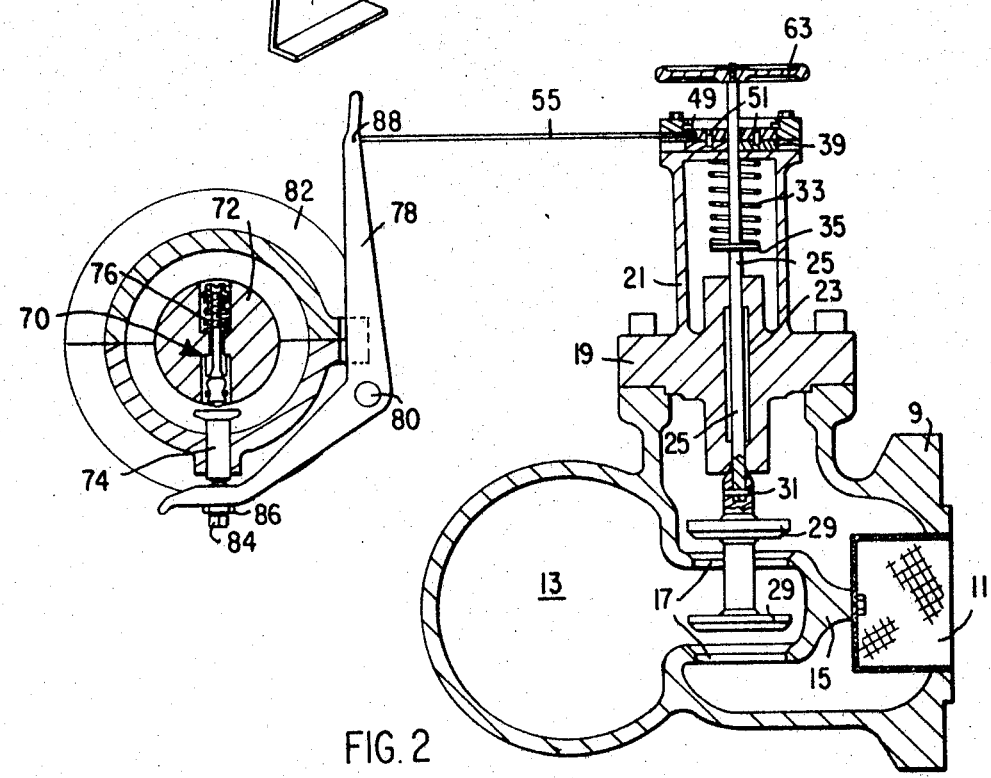
FIGURE 2 is a partial sectional view of the turbine illustrating the overspeed trip mechanism and the combination throttle and trip valve.
Figure 3:
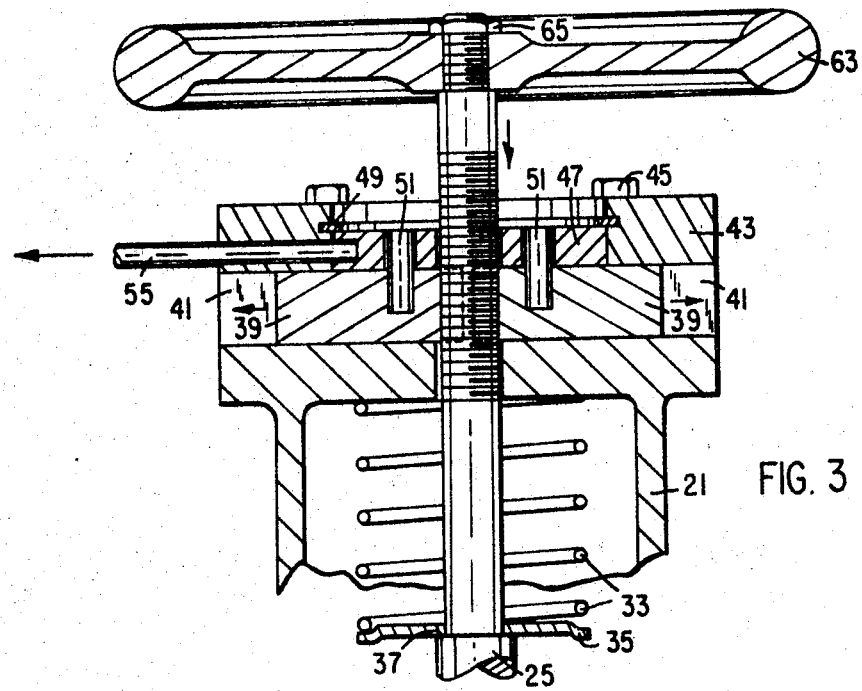
FIGURE 3 is a side elevational view of the upper portion of the valve illustrated in FIGURE 2.

The overspeed mechanism, best illustrated in FIGURE 2, comprises an overspeed trip weight 70 mounted in turbine shaft 72 for engagement with actuator pin 74 when the centrifugal force of overspeed trip weight 70 exceeds the restraining force of spring 76, which is provided to maintain weight 70 within shaft 72 under normal operating speeds. Actuator pin 74 is provided for engagement with trip means including lever 78 which is pivoted on pin 80 affixed to the turbine housing 82. An adjusting bolt 84 having a lock nut 86 thereon is threaded through lever 78 for adjustable engagement with actuator pin 74. The trip rod 55 is attached to lever 78 by a pin 88.

As can be seen from the foregoing description, under normal operating conditions, the valve stem is positioned by rotating the handwheel 63 to provide the desired quantity of steam to the turbine. If an abnormal condition occurs causing the turbine to overspeed, the overspeed trip weight will push actuator pin 74 outwardly against lever 78, causing lever 78 to pivot about pin 80 and pull trip rod 55 from detent 57 in cam block 47, thereby allowing lever 59 to rotate cam block 47. The rotation of cam block 47 will effect an outward movement of each half of the split nut 39 causing disengagement thereof from valve stem 25 allowing the valve stem to drop and immediately close passageways 17. Since the detent 57 is not aligned with trip rod 55 when the valve is tripped, the trip rod 55 will be held from its normal position, thereby insuring the lever 78 and the actuator pin are in a position to prevent contact between overspeed trip weight 70 and actuator pin 74 to prevent undue wear therebetween.

While I have described and illustrated a pereferred embodiment of my invention, it will be understood that my invention is not limited thereto since it might be otherwise embodied within the scope of the following claims.

I claim:

1. In combination with a steam turbine including an overspeed mechanism operably associated with the steam turbine and trip means engaged by said overspeed mechanism under certain predetermined shaft operating conditions:

a combination throttle and trip valve having a valve housing with inlet and exhaust passages formed therein;

a partition having a passageway therethrough formed in said housing between the inlet and exhaust passages thereof;

a threaded valve stem mounted in said housing for movement relative thereto;

a disk, operably associated with said valve stem, for regulating the flow of fluid through the partition passageways in response to valve stem movement;

a threaded split nut mounted on said housing for engagement with said threaded valve stem;

a cam block having cam tracks and a detent formed therein, said cam block being mounted for rotational movement about said valve stem;

cam pins, affixed to said split nut for engagement in the cam tracks of said cam block, movement of said cam block causing movement of said split nut relative to said valve stem;

guide tracks formed in said valve housing, said split nut being adapted for sliding movement relative thereto, rotation of said cam block causing each half of said split nut to move in said guide tracks relative to said valve stem;

biasing means for moving said valve stem and disk to block flow of fluid through the valve when said split nut is disengaged;

biasing means associated with said cam block for urging said block in a direction to disengage said split nut from said valve stem; and a trip rod adapted for engagement in the detent of said cam block and operably associated with said trip means to cause said split nut to disengage said valve stem at turbine overspeed, said trip rod being held in tripped position by said cam block when said split nut is disengaged from said valve stem.

2. In combination with the steam turbine including a mechanism operably associated with the steam turbine, and trip means engaged by said mechanism under certain predetermined turbine operating conditions:

a combination throttle and trip valve having a valve housing with inlet and exhaust passages formed therein;

a partition having a passageway therethrough formed in said housing between the inlet and exhaust passages thereof;

a threaded valve stem mounted in said housing for movement relative thereto;

a disk, operably associated with said valve stem, for regulating the flow of fluid through the partition passageway in response to valve stem movement;

a threaded split nut mounted on said housing for engagement with said threaded valve stem;

a cam block having cam tracks and a detent formed therein, said cam block being mounted for rotational movement about said valve stem;

cam pins, affixed to said split nut for engagement in the cam tracks of said cam block, movement of said cam block causing movement of said split nut relative to said valve stem;

guide tracks formed in said valve housing, said split nut being adapted for sliding movement relative thereto, rotation of said cam block causing each half of said split nut to move in said guide tracks relative to said valve stem;

biasing means for moving said valve stem and disk to block flow of fluid through the valve when said split nut is disengaged;

biasing means associated with said cam block for urging said block in a direction to disengage said split nut from said valve stem; and a trip rod adapted for engagement in the detent of said cam block and operably associated with said trip means to cause said split nut to disengage said valve stem at turbine overspeed, said trip rod being held in tripped position by said cam block when said split nut is disengaged from said valve stem.

References Cited

UNITED STATES PATENTS

| 838,455 | 12/1906 | Rice | 137—31 X |
| 927,943 | 7/1909 | Callan | 137—57 |
| 1,017,619 | 2/1912 | Callan | 137—57 X |
| 1,626,804 | 5/1927 | Flanders | 137—31 |
| 2,644,485 | 7/1953 | Schwendner | 137—31 X |

CLARENCE R. GORDON, Primary Examiner

U.S. Cl. X.R.

137—57